US011883951B2

(12) United States Patent
Bellucci et al.

(10) Patent No.: US 11,883,951 B2
(45) Date of Patent: Jan. 30, 2024

(54) GRIPPING DEVICE HAVING A PAIR OF DEFORMABLE GRIPPING ELEMENTS CONFIGURED TO FORM AN INNER GRIPPING SPACE AND TO RETAIN A CONTAINER IN THE INNER GRIPPING SPACE

(71) Applicant: AEA S.R.L., Ancona (IT)

(72) Inventors: Luca Bellucci, Fossato di Vico (IT); Massimo Fianchini, Castelbellino (IT); Michele Mengoni, Ancona (IT)

(73) Assignee: AEA S.R.L., Angeli di Rosora (IT)

( * ) Notice: Subject to any disclaimer, the term of this patent is extended or adjusted under 35 U.S.C. 154(b) by 404 days.

(21) Appl. No.: 17/197,829

(22) Filed: Mar. 10, 2021

(65) Prior Publication Data
US 2021/0283786 A1    Sep. 16, 2021

(30) Foreign Application Priority Data

Mar. 11, 2020    (IT) .................. 102020000005257

(51) Int. Cl.
*B25J 15/00*    (2006.01)

(52) U.S. Cl.
CPC ....... *B25J 15/0042* (2013.01); *B25J 15/0028* (2013.01)

(58) Field of Classification Search
CPC .......................... B25J 15/0042; B25J 15/0028
USPC ....................................... 294/99.1
See application file for complete search history.

(56) References Cited

U.S. PATENT DOCUMENTS

| 5,102,177 | A | * | 4/1992 | Dreisig ............... B25B 7/06 294/902 |
| 6,079,541 | A | * | 6/2000 | Bercelli ............ B08B 9/426 198/470.1 |
| 7,718,135 | B2 | | 5/2010 | Himmelsbach et al. |
| 8,002,106 | B2 | * | 8/2011 | Preti ............... B65G 47/847 198/470.1 |
| 8,011,708 | B2 | * | 9/2011 | Becker ............ B25J 9/142 294/196 |

(Continued)

FOREIGN PATENT DOCUMENTS

| DE | 10 2008 055 617 A1 | 5/2010 |
| EP | 1 008 604 A2 | 4/2001 |

(Continued)

OTHER PUBLICATIONS

Italian Search Report dated Nov. 17, 2020, issued in Italian Application No. 202000005257.

*Primary Examiner* — Paul T Chin
(74) *Attorney, Agent, or Firm* — Workman Nydegger

(57) ABSTRACT

A gripping device includes a body defining a constraint opening. A gripping member is engaged to the body and is configured to grasp a container. The gripping member includes deformable gripping elements arranged in correspondence of the constraint opening and configured to embrace, when the gripping device is in use, a respective portion of the container. The gripping elements are configured to form an inner gripping space. The gripping member is configured to operate at least between a rest configuration and a gripping configuration wherein the deformable gripping elements are deformed and retain, when the gripping device is in use and in correspondence of the inner gripping space, a container.

15 Claims, 4 Drawing Sheets

(56) References Cited

U.S. PATENT DOCUMENTS

| | | | | |
|---|---|---|---|---|
| 8,424,940 | B2* | 4/2013 | Sarda | B65G 47/847 294/90 |
| 8,672,376 | B1* | 3/2014 | Wilson | B65G 47/847 294/99.1 |
| 9,746,012 | B2 | 8/2017 | Warrick et al. | |
| 10,259,665 | B2* | 4/2019 | Fahldieck | B65G 47/847 |
| 10,294,041 | B2* | 5/2019 | Mallitzki | B65G 47/908 |
| 10,773,392 | B2* | 9/2020 | Bright | B25J 9/0015 |
| 2005/0167999 | A1 | 8/2005 | Beal | |
| 2015/0336699 | A1* | 11/2015 | Fahldieck | B65G 47/847 198/803.3 |
| 2019/0307643 | A1 | 10/2019 | Tribble et al. | |

FOREIGN PATENT DOCUMENTS

| | | |
|---|---|---|
| EP | 2 292 206 A1 | 3/2011 |
| ES | 2708306 T3 | 4/2019 |
| WO | 2018/162212 A1 | 9/2018 |

* cited by examiner

GRIPPING DEVICE HAVING A PAIR OF DEFORMABLE GRIPPING ELEMENTS CONFIGURED TO FORM AN INNER GRIPPING SPACE AND TO RETAIN A CONTAINER IN THE INNER GRIPPING SPACE

CROSS-REFERENCE TO RELATED APPLICATIONS

The present application claims priority to Italian Application No. 102020000005257, filed Mar. 11, 2020, which is incorporated herein by specific reference.

FIELD OF THE INVENTION

The present invention relates to a gripping device configured to grasp a container, such as a bottle.

The invention further relates to a use of a gripping device.

The present invention also relates to an apparatus comprising a gripping device.

The invention which is detailed below also relates to a process for gripping a container.

The present invention also relates to a process for producing a gripping device.

The invention can find advantageous application in the biomedical sector, in particular for processing containers, such as bottles, containing a liquid and/or powdered substance for medical use.

BACKGROUND ART

It is known about devices suited for gripping a container for medical use, for example from earlier documents U.S. Pat. No. 9,746,012B2, U.S. Pat. No. 7,718,135B2, EP2292206B1 and ES2708306T3.

In particular, the device known from U.S. Pat. No. 9,746,012B2 has a self-centering vial clamp structure. The body of the device has a vial aperture and a gripper consisting of two clamp jaws that can be moved towards one another and arranged around the vial aperture. The device further comprises two lever arms coupled to the two clamp jaws. A lever arm is configured to be manually pivoted and translates the pivoting motion into a sliding motion of the corresponding clamp jaw. The device also features gears connected to the lever arms, which determine a movement substantially in unison of the clamp jaws.

The structure of the device of U.S. Pat. No. 9,746,012B2 happens to be complex and expensive to produce. Furthermore, due to the multiple components and gears of the device, it may be subject to damage or breakage; the damage or breakage of a single component of the device just described can lead to the malfunction of the device itself.

Furthermore, the device of U.S. Pat. No. 9,746,012B2 provides for a manual activation of a lever arm, which triggers the gripper in order to clamp the vial; therefore, this device is subject to variability depending on the interaction of an operator. For example, if an operator is not sufficiently experienced in activating the lever arm of the device, the vial gripping by the gripper can prove inefficient and the vial can be damaged or broken, or the device could even break, for example if the force applied on the lever arm is excessive.

In the light of the above, the devices of the known art present considerable drawbacks and can be improved from many points of view.

OBJECTIVES OF THE INVENTION

The objective of the present invention is, therefore, to solve at least one of the drawbacks and/or limitations of the preceding technical solutions.

A first objective of the present invention is to provide a gripping device that is effective and reliable when in operation, allowing a stable, safe and secure grip of containers.

It is also an objective of the present invention to provide a gripping device that allows grasping a plurality of containers adapting to them, in particular adapting to the differences in the characteristic dimension (for example the diameter) of the containers without compromising at all the stability, the safety and the strength of the grip of the containers.

It is also an objective of the present invention to provide a gripping device for which an interfacing with an automatic arm, such as a robotic arm, is allowed for handling the gripping device and consequently the container which has been grasped.

It is a further objective of the present invention to provide a gripping device that is compatible with automatic devices, such as stirrers or scales, for processing and/or analyzing the content of the container that the gripping device is configured to retain.

One of the objectives of the present invention is also to provide a gripping device that is particularly economical to produce, quite easy to use and fully compatible with the requirements of the biomedical sector (for example the ability to be subjected to sterilization treatments).

A further objective of the present invention is to provide a process for grasping a container that allows grasping and retaining a container in a stable, firm and safe manner.

The objectives described above with reference to the gripping device and to the process for grasping a container are also shared by a use of a gripping device, an apparatus comprising a gripping device and a process for producing a gripping device.

These and other objectives, which will become clearer in the following description, are substantially achieved by a gripping device, by a process for gripping a container, by a use of a gripping device, by an apparatus comprising a gripping device and by a process for producing a gripping device in accordance with one or more of the appended claims and/or with one or more of the following aspects.

SUMMARY

Aspects of the invention are described below.

In a 1st aspect, a gripping device is provided, comprising:
a body defining a bipartite constraint opening divided into
  a first zone and a second zone,
a gripping member configured to grasp a container, such
  as a bottle, for example in correspondence of a neck of
  the container, the gripping member being engaged to
  the body and comprising:
  a first deformable gripping element, arranged in correspondence of the first zone, the first deformable
    gripping element being configured to embrace, when
    the gripping device is in use, a first portion of the
    container,
  a second deformable gripping element, arranged in
    correspondence of the second zone, the second
    deformable gripping element being configured to
    embrace, when the gripping device is in use, a
    second portion of the container distinct from the first
    portion of the container, the first deformable gripping element and the second deformable gripping element being configured to form an inner gripping space.

In a 2nd aspect in accordance with the 1st aspect, the gripping member is configured to operate at least between:
- a rest configuration,
- a gripping configuration wherein the first deformable gripping element and the second deformable gripping element are deformed and retain, when the gripping device is in use and in correspondence of the inner gripping space, a container, in the gripping configuration the first deformable gripping element being in contact with the first portion of the container and the second deformable gripping element being in contact with the second portion of the container.

In a 3rd aspect in accordance with the 1st or 2nd aspect, each of the first deformable gripping element and the second deformable gripping element comprises a gripping neck defining a shaped recess configured to embrace at least partially, in the gripping configuration, a respective portion of the container, in the gripping configuration the gripping neck of the first deformable gripping element and the gripping neck of the second deformable gripping element defining, by interposition, the inner gripping space.

In a 4th aspect in accordance with the 3rd aspect, each gripping neck has a surface with curved or planar segments.

In a 5th aspect in accordance with the 4th aspect, each segment is substantially planar and lies in a plane not coplanar to a lying plane of an adjacent segment.

In a 6th aspect in accordance with the 3rd or 4th or 5th aspect, each gripping neck includes a first segment, a second segment and a third segment, the second segment being interposed between the first segment and the third segment, each segment being planar, the first segment, the second segment and the third segment lying in respective planes not coplanar to each other, at least one of said segments being configured for contacting and embracing, in the gripping configuration, a portion of the container.

In a 7th aspect in accordance with any one of the aspects from 3rd to 6th, each gripping neck has a surface defined on at least one inclined plane with respect to a lying plane of the body.

In an 8th aspect in accordance with the 7th aspect, the plane of said surface is inclined with respect to the lying plane of the body by an angle comprised between 45° and 90°.

In a 9th aspect in accordance with any one of the preceding aspects, the gripping member has a thickness, for example defined in correspondence of the respective gripping neck, at least equal to 4 mm or 5 mm, the thickness being measured along a direction orthogonal to the lying plane of the body.

In a 10th aspect in accordance with the 9th aspect, said thickness is comprised between 4 mm and 30 mm.

In an 11th aspect in accordance with any one of the preceding aspects, the deformable gripping element includes:
- a first connector operating on the first deformable gripping element, the first connector being deformable and being configured to provide deformation responsiveness to the first deformable gripping element at least upon the transition of the gripping member from the rest configuration to the gripping configuration,
- a second connector operating on the second deformable gripping element, the second connector being deformable and being configured to provide deformation responsiveness to the second deformable gripping element at least upon the transition of the gripping member from rest configuration to gripping configuration, the first connector and the second connector being configured to deform upon the transition of the gripping member from the rest configuration to the gripping configuration.

In a 12th aspect in accordance with the 11th aspect, each deformable gripping element comprises an end, for example a distal end, the first connector connecting the end of the first deformable gripping element to a perimeter portion of the constraint opening in correspondence of the first zone and the second connector connecting the end of the second deformable gripping element to a perimeter portion of the constraint opening in correspondence of the second zone.

In a 13th aspect in accordance with the 11th or 12th aspect, between each connector and a perimeter portion adjacent to the constraint opening, a gap is defined in such a way as to allow, in correspondence of said gap, a deformation of the connector.

In a 14th aspect in accordance with the 11th or 12th or 13th aspect, the first connector and the second connector are configured to deform upon the transition of the gripping member from the rest configuration to the gripping configuration.

In a 15th aspect in accordance with any one of the aspects from 11th to 14th, the first connector and the second connector are elastically deformable.

In a 16th aspect in accordance with any one of the aspects from 11th to 15th, each of the first connector and the second connector comprises a rod or a plate.

In a 17th aspect in accordance with the 16th aspect, the rod or plate of the first connector is engaged to the body in correspondence of the first zone and the rod or plate of the second connector is engaged to the body in correspondence of the second zone.

In an 18th aspect in accordance with any one of the preceding aspects, the first deformable gripping element and the second deformable gripping element are elastically deformable.

In a 19th aspect in accordance with any one of the preceding aspects, each of the first deformable gripping element and the second deformable gripping element has a conformation, for example substantially a "V" shaped one, equipped with a first flap and a second flap joined together in correspondence of a distal end.

In a 20th aspect in accordance with any one of the preceding aspects, each of the first deformable gripping element and the second deformable gripping element comprises at least one reinforcing rib.

In a 21st aspect in accordance with the 20th aspect, said at least one reinforcing rib develops transversely and in interposition with respect to the first flap and the second flap.

In a 22nd aspect in accordance with any one of the preceding aspects, each of the first deformable gripping element and the second deformable gripping element is tapered and develops between an attachment portion in correspondence of which it is engaged to the constraint opening and a distal end.

In a 23rd aspect in accordance with any one of the aspects from 19th to 22nd, each of the first deformable gripping element and the second deformable gripping element comprises an attachment flap, the attachment flap being connected to at least one of the first flap and the second flap and connecting said at least one of the first flap and the second flap to a perimeter portion of the constraint opening in correspondence with the respective zone.

In a 24th aspect in accordance with the 22nd or 23rd aspect, the attachment portion comprises the attachment flap directly connected to one of the first flap and the second flap and the other between the first flap and the second flap not directly connected to the attachment flap.

In a 25th aspect in accordance with any one of the aspects from 11th to 24th, the first connector and the second connector are engaged respectively at the distal end of the first deformable gripping element and at the distal end of the second deformable gripping element.

In a 26th aspect in accordance with any one of the aspects from 22nd to 25th, the attachment portion of the first deformable gripping element and the attachment portion of the second deformable gripping element are engaged in correspondence of opposite portions of the constraint opening.

In a 27th aspect in accordance with any one of the preceding aspects, the first deformable gripping element and the second deformable gripping element have, with reference at least to the gripping configuration, a specular structure, especially an inverted specular structure wherein the first deformable gripping element and the second deformable gripping element are arranged specularly and with an angular offset of 180° with respect to one another.

In a 28th aspect in accordance with any one of the preceding aspects, the body defines a jaw structure comprising a first gripping jaw and a second gripping jaw, the first zone being defined in correspondence with the first gripping jaw and the second zone being defined in correspondence with the second gripping jaw, the first deformable gripping element being carried by and being integral with the first gripping jaw and the second deformable gripping element being carried by and being integral with the second gripping jaw.

In a 29th aspect in accordance with the 28th aspect, the first gripping jaw and the second gripping jaw have a substantially specular structure.

In a 30th aspect in accordance with the 28th or 29th aspect, the first gripping jaw and the second gripping jaw are hinged to each other.

In a 31st aspect in accordance with the 28th or 29th or 30th aspect, the first gripping jaw and the second gripping jaw are configured to be relatively moved at least between a rest configuration at least partially open and a clamped gripping configuration, the relative movement between the first gripping jaw and the second gripping jaw in the transition from the open rest configuration to the clamped gripping configuration determining the relative approach between the first deformable gripping element and second deformable gripping element and the relative movement between the first gripping jaw and the second gripping jaw in and the transition from the clamped gripping configuration to the open rest configuration determining the relative distancing between the first deformable gripping element and the second deformable gripping element.

In a 32nd aspect in accordance with any one of the aspects from 28th to 31st, the first gripping jaw and second gripping jaw constitute two distinct pieces of the body hinged to each other.

In a 33rd aspect in accordance with any one of the aspects from 28th to 32nd, the first gripping jaw and the second gripping jaw are made by molding, for example by injection molding of plastic or polymeric material, such as polypropylene.

In a 34th aspect in accordance with any one of the aspects from 1st to 31st, the body is monolithic.

In a 35th aspect in accordance with any one of the aspects from 1st to 31st or to 33rd or to 34th, the first gripping jaw and the second gripping jaw are monolithic.

In a 36th aspect in accordance with the 34th or 35th aspect, the first gripping jaw and the second gripping jaw are not movable with respect to each other.

In a 37th aspect in accordance with any one of the preceding aspects, the gripping device comprises pre-tensioning means operating on the deformable gripping elements and configured to operate in at least one configuration wherein they keep the deformable gripping elements in a widened configuration.

In a 38th aspect in accordance with the 37th aspect, the pre-tensioning means are configured to operate in a further configuration wherein they do not operate a pretension force and allow the deformable gripping elements to assume a close configuration.

In a 39th aspect in accordance with the 37th or 38th aspect, the pretension means are of the elastic type.

In a 40th aspect in accordance with the 37th or 38th or 39th aspect, the pretension means include at least one spring.

In a 41st aspect in accordance with any of the preceding aspects, the body is obtained by molding, for example by injection molding of plastic or polymeric material, such as polypropylene.

In a 42nd aspect in accordance with any one of the preceding aspects, the gripping device furthermore comprises constraint elements cooperating with each other and configured to constrain the first deformable gripping element and the second deformable gripping element in position, in the gripping configuration.

In a 43rd aspect in accordance with the 42nd aspect, the constraint elements comprise a constraint head and a constraint housing, the constraint head being configured for insertion into the constraint housing and engaging within it to define the gripping configuration of the gripping member.

In a 44th aspect in accordance with the 43rd aspect, the constraint head is substantially wedge-shaped or arrow-shaped.

In a 45th aspect in accordance with the 43rd or 44th aspect, the constraint housing comprises deformable constraint flaps, the constraint head being configured to deform said constraint flaps when engaging in correspondence of the housing.

In a 46th aspect in accordance with the 43rd or the 44th or the 45th aspect, the coupling between the constraint head and the housing, in particular between the constraint head and said constraint flaps, is of the snap type.

In a 47th aspect in accordance with any one of the aspects from 43rd to 46th, the constraint head is defined in correspondence of one between the first gripping jaw and the second gripping jaw and the constraint housing is defined in correspondence of the other between the first gripping jaw and the second gripping jaw.

In a 48th aspect in accordance with any one of the aspects from 42nd to 47th, the constraint elements are defined in proximity of a hinge connecting the first gripping jaw and the second gripping jaw.

In a 49th aspect in accordance with any one of the aspects from 42nd to 48th, the constraint elements are engaged to the body at least on the opposite side with respect to the portion in correspondence of which the first gripping jaw and the second gripping jaw are hinged.

In a 50th aspect in accordance with any one of the aspects from 42nd to 49th, the constraint elements are engaged to the body both in proximity of the portion in correspondence of which the first gripping jaw and the second gripping jaw are hinged, and on the opposite side with respect to the portion in correspondence of which the first gripping jaw and the second gripping jaw are hinged.

In a 51st aspect in accordance with any one of the preceding aspects, the gripping device also includes positioning stops, the positioning stops being configured to allow a predetermined positioning between the first gripping jaw and the second gripping jaw in the gripping configuration.

In a 52nd aspect in accordance with the 51st aspect, the positioning stops comprise a concave seat and a protrusion configured to be housed in the concave seat.

In a 53rd aspect in accordance with the 52nd aspect, at least one of the first gripping jaw and the second gripping jaw comprise at least one concave seat and the other between the first gripping jaw and the second gripping jaw includes at least one protrusion configured to be housed, in the gripping configuration of the gripping device, in correspondence of said at least one concave seat.

In a 54th aspect in accordance with the 51st or 52nd or 53rd aspect, the positioning stops are defined in proximity of a hinge connecting the first gripping jaw and second gripping jaw.

In a 55th aspect in accordance with any one of the aspects from 51st to 54th, the positioning stops are engaged with the body at least on the opposite side with respect to the portion in correspondence of which the first gripping jaw and the second gripping jaw are hinged.

In a 56th aspect in accordance with any one of the aspects from 51st to 55th, the positioning stops are engaged to the body both in proximity of the portion in correspondence of which the first gripping jaw and the second gripping jaw are hinged, and on the opposite side with respect to the portion in correspondence of which the first gripping jaw and the second gripping jaw are hinged.

In a 57th aspect in accordance with any one of the preceding aspects, the body has at least one through-hole configured to allow the insertion of an elongated element, such as a rod or a pin, intended to move the gripping device by agitating it, when the gripping device is in use.

In a 58th aspect in accordance with the 57th aspect, the body has through-holes arranged in correspondence of opposite longitudinal ends of the body.

In a 59th aspect in accordance with the 57th or the 58th aspect, the body presents a pair of through-holes arranged in correspondence of the same longitudinal end of the body.

In a 60th aspect in accordance with the 57th or the 58th or the 59th aspect, the body presents a first pair of through-holes arranged in correspondence of a first longitudinal end of the body and a second pair of through-holes opposite the first pair of through-holes and arranged in correspondence of a second longitudinal end of the body.

In a 61st aspect in accordance with any one of the preceding aspects, the body comprises at least one gripping element adapted to allow a gripping of the gripping device, for example by a handling device, such as a mechanical or robotic arm.

In a 62nd aspect in accordance with the 61st aspect, the body comprises gripping elements arranged in correspondence of opposite lateral ends of the body.

In a 63rd aspect in accordance with the 61st or 62nd aspect, the body comprises a pair of gripping elements arranged in correspondence of the same lateral end of the body, the gripping elements of the pair of gripping elements being arranged side by side.

In a 64th aspect in accordance with the 61st or 62nd or 63rd aspect, each gripping element comprises a camber.

In a 65th aspect in accordance with any one of the preceding aspects, the body is in plastic or polymeric material, such as polypropylene.

In a 66th aspect in accordance with any one of the preceding aspects, the gripping member is of the disposable type.

In a 67th aspect in accordance with any one of the preceding aspects, the gripping member is replaceable and interchangeable with a further gripping member.

In a 68th aspect in accordance with any one of the preceding aspects, the gripping device is of the disposable type.

In a 69th aspect in accordance with any one of the preceding aspects, the gripping device has a plurality of through openings with respect to the body, said openings being configured to allow the passage of and/or to channel a flow of fluid, such as air, during sterilization of the gripping device or at least one part or component thereof.

In a 70th aspect it is provided a use of the gripping device in accordance with any one of the preceding aspects and/or any one of the appended claims of a gripping device for grasping a container, such as a bottle.

In a 71st aspect in accordance with the 70th aspect, the use provides to retain the container while the gripping member is in the gripping configuration.

In a 72nd aspect, an apparatus is provided for processing at least one container such as a bottle, optionally containing a liquid and/or powdered substance, comprising at least one gripping device in accordance with any one of the aspects from 1st to 69th and/or in accordance with any one of the appended claims for a gripping device.

In a 73rd aspect in accordance with the 72nd aspect, the apparatus further comprises a carousel comprising at least one housing configured to house said at least one gripping device, said at least one gripping device being apt to be positioned or being positioned at least partially in correspondence with said at least one housing.

In a 74th aspect in accordance with the 73rd aspect, the housing is at least partially counter-shaped to an external profile of said at least one gripping device.

In a 75th aspect in accordance with the 72nd or 73rd or 74th aspect, the apparatus further comprises a handling device, such as a mechanical or robotic arm, configured to move said at least one gripping device.

In a 76th aspect in accordance with the 75th aspect, the handling device includes a gripper configured to grasp the gripping device, for example in correspondence of one or more gripping elements.

In a 77th aspect in accordance with any one of the aspects from 72nd to 76th, the apparatus further comprises a suction station.

In a 78th aspect in accordance with the 77th aspect and one of the 75th and the 76th aspect, the handling device is configured to move the gripping device and the relative container retained by it in correspondence of the suction station.

In a 79th aspect in accordance with any one of the aspects from 72nd to 78th, the device further comprises a weighing station, optionally including a scale.

In an 80th aspect in accordance with the 79th aspect, the weighing station is configured to weigh the container and/or its content.

In an 81st aspect in accordance with any one of the aspects from 72nd to 80th, the apparatus comprises an injection station.

In an 82nd aspect in accordance with the 81st aspect, the injection station is configured to inject a substance into the container.

In an 83rd aspect in accordance with any one of the aspects from 72nd to 82nd, the apparatus further comprises a stirrer configured to agitate the gripping device and, when the gripping device is in use, the container retained by the gripping member.

In an 84th aspect in accordance with the 83rd aspect, the stirrer comprises at least one elongated element, in particular a plurality of elongated elements, each elongated element being configured to be inserted in correspondence of a respective through-hole of the body.

In an 85th aspect in accordance with the 84th aspect, each elongated element includes a rod or pin.

In an 86th aspect in accordance with any one of the aspects from 72nd to 85th, the apparatus comprises a rest station configured to allow the rest of the container and its content.

In an 87th aspect in accordance with the 86th aspect, the rest station is arranged downstream the stirrer.

In an 88th aspect, a process for grasping a container, such as a bottle, is provided, comprising the steps of:
- providing a gripping device in accordance with any one of the aspects from 1st to 69th and/or in accordance with any one of the appended claims for a gripping device,
- retaining a portion of a container such as a bottle, for example a neck of a container, by means of the first deformable gripping element and the second deformable gripping element.

In an 89th aspect in accordance with the 88th aspect, the step of providing a gripping device comprises providing a gripping device whose gripping member is in the rest configuration, the process comprising a step of determining a transition of the gripping member from the rest configuration to the gripping configuration, the step of determining a transition of the gripping member from the rest configuration to the gripping configuration comprising the step of retaining a portion of the container such as a bottle by the first deformable gripping element and the second deformable gripping element.

In a 90th aspect in accordance with the 89th aspect, the step of determining a transition of the gripping member from the rest configuration to the gripping configuration comprises bringing the first gripping jaw and the second gripping jaw close to one another.

In a 91st aspect in accordance with the 90th aspect, the step of bringing the first gripping jaw and the second gripping jaw close to one another comprises:
- bringing the gripping neck of the first deformable gripping element into contact with a first portion of the container,
- bringing the gripping neck of the second deformable element into contact with a second portion of the container.

In a 92nd aspect in accordance with the 89th or 90th or 91st aspect, the step of determining a transition of the gripping member from the rest configuration to the gripping configuration comprises rotating in relative approach the first gripping jaw and the second gripping jaw.

In a 93rd aspect in accordance with any one of the aspects from 89th to 92nd, the step of determining a transition of the gripping member from the rest configuration to the gripping configuration comprises relatively approaching, for example by translation, the first gripping jaw and the second gripping jaw.

In a 94th aspect in accordance with any one of the aspects from 88th to 93rd, the process comprises a step of placing a container between the first gripping jaw and second gripping jaw or inserting a portion of a container, for example the neck of a container, in correspondence of the inner gripping space.

In a 95th aspect in accordance with the 94th aspect, the step of placing a container between the first gripping jaw and the second gripping jaw is prior to the step of bringing the first gripping jaw and the second gripping jaw close to one another.

In a 96th aspect in accordance with any one of the aspects from 91st to 95th:
- the step of bringing the gripping neck of the first deformable gripping element into contact with a first portion of the container comprises deforming, for example elastically, the first deformable gripping element,
- the step of bringing the gripping neck of the second deformable gripping element into contact with a second portion of the container comprises deforming, for example elastically, the second deformable gripping element.

In a 97th aspect in accordance with any one of the aspects from 91st to 96th:
- the step of bringing the gripping neck of the first deformable gripping element into contact with a first portion of the container comprises deforming, for example elastically, the first connector,
- the step of bringing the gripping neck of the second deformable gripping element into contact with a second portion of the container comprises deforming, for example elastically, the second connector.

In a 98th aspect in accordance with any one of the aspects from 88th to 97th, the step of retaining a portion of the container such as a bottle by the first deformable gripping element and the second deformable gripping element comprises relatively approaching the first deformable gripping element and the second deformable gripping element.

In a 99th aspect in accordance with any one of the aspects from 88th to 98th, the process comprises a step of providing a container such as a bottle, the container being optionally fitted with a neck.

In a 100th aspect, it is provided for a process for producing a gripping device in accordance with any one of the aspects from 1st to 69th and/or in accordance with any one of the appended claims of a gripping device, comprising the steps of:
- providing a body defining a bipartite constraint opening divided into a first zone and a second zone,
- providing a gripping member configured to grasp a container, such as a bottle, for example in correspondence of the neck of the container, and comprising:
  - a first deformable gripping element configured for embracing, when the gripping device is in use, a first portion of the container,
  - a second deformable gripping element configured for embracing, when the gripping device is in use, a second portion of the container different from the first portion of the container,
- engaging the gripping member to the body, the step of engaging the gripping member to the body including the steps of:
  - arranging the first deformable gripping element in correspondence of the first zone,
  - arranging the second deformable gripping element in correspondence of the second zone.

In a 101st aspect in accordance with the 100th aspect, at least one of the steps of providing a body defining a bipartite constraint opening divided into a first zone and a second zone, providing a gripping member configured for gripping a container and engaging the gripping member to the body is obtained by molding, for example by injection molding of plastic or polymeric material, such as polypropylene.

In a 102nd aspect in accordance with the 100th or 101st aspect, the process comprises a step of molding by injection, in plastic or polymeric material such as polypropylene, at least one of the body and the gripping member.

In a 103rd aspect in accordance with the 100th or 101st or 102nd aspect, the process comprises a step of molding by injection, in plastic or polymeric material such as polypropylene, both the body and the gripping member.

In a 104th aspect in accordance with the 103rd aspect, the step of molding by injection, in plastic or polymeric material such as polypropylene, both the body and the gripping member includes:
  making the body,
  making the gripping member.

In a 105th aspect in accordance with any one of the aspects from 100th to 104th, the step of arranging a body defining a bipartite constraint opening divided into a first zone and a second zone comprises providing a reusable body, for example in metallic material.

In a 106th aspect in accordance with any one of the aspects from 100th to 105th, the step of providing a gripping member configured to grasp a container comprises providing a gripping member of the disposable type.

In a 107th aspect in accordance with any one of the aspects from 1st to 106th, the body has a greater rigidity than the gripping member.

In a 108th in accordance with any one of the aspects from 1st to 107th, the gripping member has greater flexibility than the body.

In a 109th aspect in accordance with any one of the aspects from 1st to 108th, the container is intended for medical use.

In a 110th aspect in accordance with any one of the aspects from 1st to 109th, the container contains a liquid and/or powdered substance.

In a 111th aspect in accordance with any one of the aspects from 1st to 110th, the container contains a substance intended for medical use.

BRIEF DESCRIPTION OF THE DRAWINGS

Some embodiments and some aspects of the invention will be hereafter described with reference to the accompanying drawings, provided for indicative purposes only and therefore non-limiting, wherein.

DEFINITIONS AND CONVENTIONS

Figure 1:
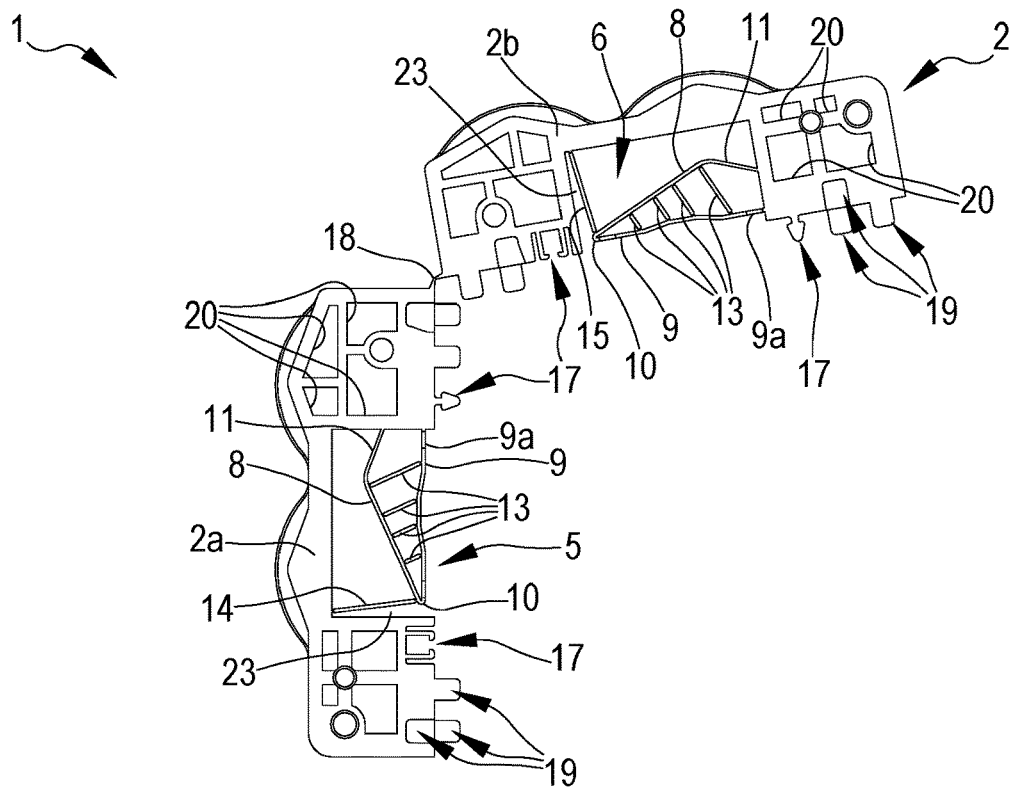
FIG. 1 is a top view of a gripping device in accordance with one embodiment of the present invention.

Note that in the present detailed description, corresponding illustrated parts in the various figures are indicated with the same numerical references. The figures could illustrate the object of the invention by means of not in scale representations; therefore, parts and components illustrated in the figures relating to the object of the invention could only concern schematic representations. In the context of this description, the use of terms such as "above", "over", "upper", "below", "under", "down", "side", "lateral", "laterally", "horizontal", "horizontally", "vertical", "vertically", "front", "frontal", "rear", and the like refers, unless otherwise specified, to at least one space orientation that the object of the invention can normally adopt under operating conditions or conditions of use. In this regard, see the annexed illustrative figures at least one possible spatial orientation of the object of the invention.

Here are some definitions that can be used in purposes of the intelligence of the present invention:
  the term "gripping device" means a device configured to grasp and retain a container,
  the term "container" means a container configured to contain a substance (for example an at least partially liquid and/or powdered substance), in particular a substance for medical/biomedical use. Examples of containers are a bottle, a vial, a bag, a syringe and similar containers used in the medical/biomedical field.

DETAILED DESCRIPTION

Gripping Device

In the annexed figures, by the reference number 1 has been overall indicated a gripping device in accordance with the present invention.

The gripping device 1 comprises a body 2. In the embodiments illustrated in the accompanying figures, the gripping device 1, in particular the body 2, has a roughly parallelepiped conformation and has two directions of development prevailing over the further direction of development, so it is possible to identify a lying plane of the gripping device 1. In terms of overall dimensions, in fact, the gripping device 1 has a length between 50 mm and 250 mm (preferably about 100 mm), a width between 30 mm and 150 mm (preferably about 68 mm) and a thickness between 5 mm and 25 mm, these dimensional parameters being however herein reported purely for explanatory but not limiting purposes.

The body 2 defines a constraint opening 3 within which a container C can be bound, as will be seen in greater detail below. Essentially, the constraint opening 3 represents a hollow portion of the gripping device 1 inside which the container C is retained when the gripping device 1 is in use.

The constraint opening 3 is divided into a first zone 3a and a second zone 3b, which constitute essentially two constraint zones. The constraint opening 3 has a perimeter delimiting, by means of respective portions, the first zone 3a and the second zone 3b. As illustrated in the accompanying figures, each portion of the perimeter delimiting a respective zone 3a, 3b can have a substantially "C" conformation (so that the constraint opening 3 exhibits overall the shape of a square or rectangle); alternative conformations can be for example "U" or "V", or further configurations configured to define a hollow area. Advantageously, the first zone 3a and the second zone 3b have a substantially identical or at least comparable extension.

The body 2 has a jaw structure comprising a first gripping jaw 2a and a second gripping jaw 2b; the first zone 3a is defined in correspondence of the first gripping jaw 2a and the second zone 3b is defined in correspondence of the second gripping jaw 2b. As illustrated in the accompanying figures, the first gripping jaw 2a and the second gripping jaw 2b have a substantially specular structure and/or conformation. As will be seen in greater detail below, the first gripping jaw 2a and the second gripping jaw 2b can be hinged to each other (see the embodiments of FIGS. 1, 2, 4, 5, 6 and 7) or they can be consisting of two respective separate pieces that can be approached and engaged to each other (see the embodiment of FIG. 3). As far as materials are concerned, the body 2 can be in plastic or polymeric material, such as polypropylene; in such embodiments, the body 2 can be made by injection molding, the one-piece configuration with gripping jaws 2a, 2b presenting in this case the advantageous possibility of being obtained by means of a single molding operation. Alternatively, the body 2 can be of metallic material.

It is intended to clarify that the present invention has no limitations regarding the technology by which the gripping device 1, in particular body 2, is made. For example, as an alternative to the previously mentioned injection molding, three-dimensional printing can be used.

Figure 2:
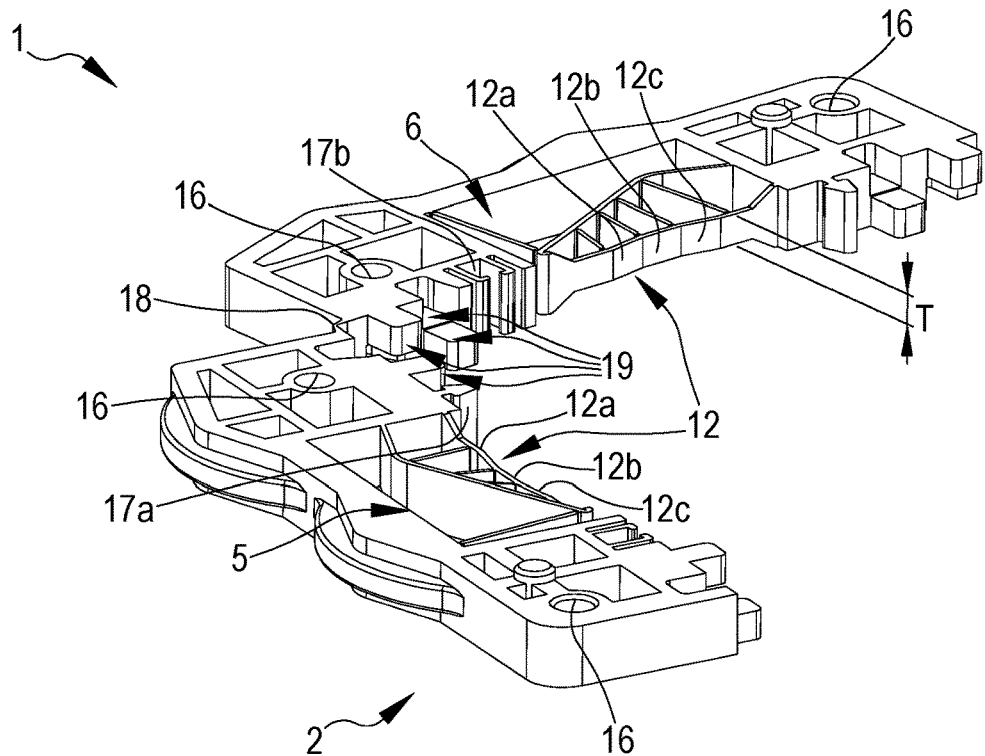
FIG. 2 is a perspective view of the gripping device of FIG. 1.
Figure 3:
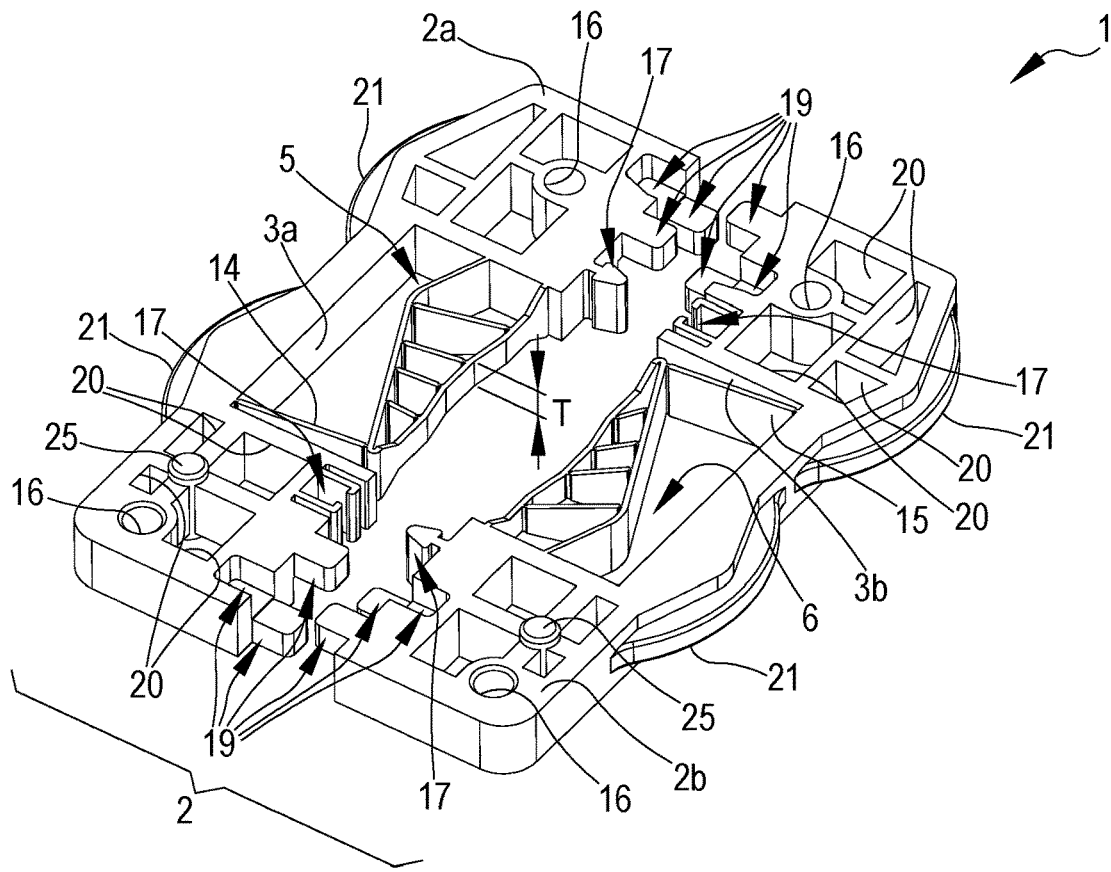
FIG. 3 is a perspective view of a gripping device in accordance with another embodiment of the present invention.
Figure 4:
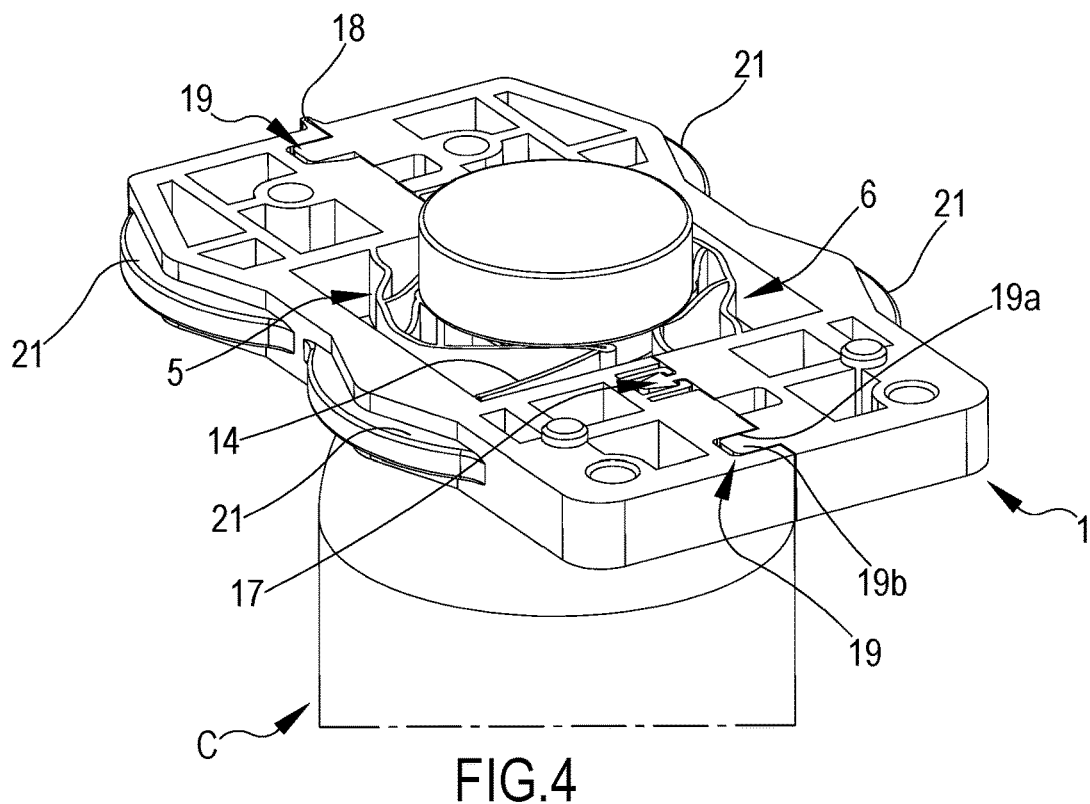
FIG. 4 shows a step of a gripping process of a container in accordance with the present invention, wherein the gripping device retains a container in correspondence of the neck of the container.

The gripping device 1 further comprises a gripping member 4 configured to grasp a container C, for example by coming in contact with it and retaining it in correspondence of a neck N of the container C. The gripping member 4 is configured to operate between a rest configuration, wherein it does not retain any container C, and a gripping configuration, wherein it embraces and holds a container C. In this regard, FIGS. 1, 2 and 3 show rest configurations of gripping devices 1 and FIGS. 4 and 5 show the operating configuration of a gripping device 1, wherein the container C is retained by the gripping member 4.

The gripping member 4 comprises a first deformable gripping element 5 and a second deformable gripping element 6. In the embodiments illustrated in the annexed figures, the first deformable gripping element 5 and the second deformable element gripping 6 have an analogous structure and/or conformation. The first deformable gripping element 5 is arranged in correspondence of the first zone 3a of the constraint opening 3 and is configured to embrace, in the gripping configuration of the gripping member 4, a first portion N1 of the container C. The second deformable gripping element 6 is arranged in correspondence of the second zone 3b of the constraint opening 3 and is configured for embracing, in the gripping configuration of the gripping member 5, a second portion N2 of the container C different from the first portion N1 of the container C. The first portion N1 and the second portion N2 of the container C can be contiguous or adjacent and, in addition or alternatively, counterposed portions of a neck N of the container C. For example, if the neck N of the container C has a cylindrical conformation, the first portion N1 of the container C can be a first annular portion of the shaped neck N with cylindrical conformation and the second portion N2 of the container C can be a second annular portion of the neck N with cylindrical conformation opposed to the first annular portion (see FIG. 5). With reference to the mutual arrangement with regard to the gripping jaws 2a, 2b, the first deformable gripping element 5 is carried by the first gripping jaw 2a and is integral with it and the second gripping element 6 is carried by the second gripping jaw 2b and is integral with it.

Figure 5:
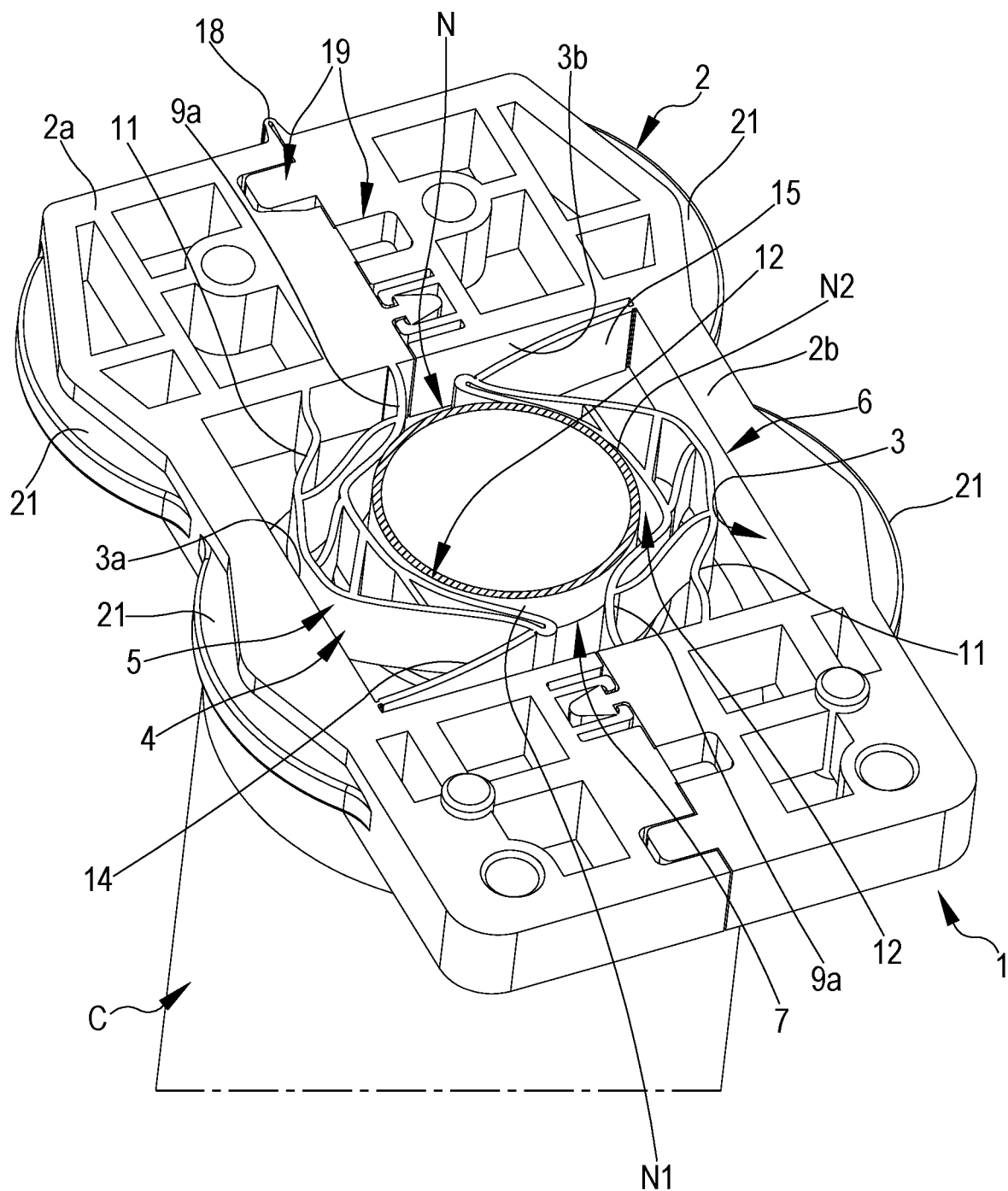
FIG. 5 is a view of the gripping device of FIG. 4, in accordance with one embodiment of the present invention, while it retains a container in correspondence of the neck of the container, wherein the container is sectioned in correspondence of the neck to show the gripping configuration of the gripping member, wherein the deformable gripping elements and the respective connectors are deformed.

The first deformable gripping element 5 and the second deformable gripping element 6 form, at least in the gripping configuration, an inner gripping space 7; in this regard, see FIG. 5, where in correspondence of the inner gripping space 7 the gripping member 4 holds a neck N of a container C by means of the deformable gripping elements 5, 6 (which in FIG. 5 appear visibly deformed exactly to adapt to the neck N of the container C and retain it with stability, safety and strength).

In the gripping configuration, the first deformable gripping element 5 and the second deformable gripping element 6 are deformed and retain, in the gripping configuration of the gripping member 4 and in correspondence of the inner gripping space 7, a container C. In the gripping configuration, the first deformable gripping element 5 contacts the first portion N1 of the container C and the second deformable gripping element contacts the second portion N2 of the container C.

The first deformable gripping element 5 and the second deformable gripping element 6 are elastically deformable and are configured to deform elastically during the transition between the rest configuration and the gripping configuration, due to the contact with the container C.

As illustrated in the annexed figures, the first deformable gripping element 5 and the second deformable gripping element 6 have, with reference to the gripping configuration of the gripping member 4, a specular structure. As illustrated in the annexed figures, in order to optimize the grip on the container C, the specular structure is an inverted specular structure, wherein the first deformable gripping element 5 and the second deformable gripping element 6 are arranged specularly and angularly offset of 180° from each other. The angular offset of 180° is defined on a lying plane of the body 2; essentially, in the gripping configuration, the second deformable gripping element 6 is rotated, on the lying plane of the body, by 180° with respect to the first deformable gripping element.

As shown in the annexed figures, each deformable gripping element 5, 6 comprises a first flap 8 and a second flap 9, which are arranged to form a substantially "V" shaped conformation of the deformable gripping element 5, 6. Each deformable gripping element 5, 6 also comprises a distal end 10 joining the first flap 8 and the second flap 9; the distal end 10 is substantially constituted by the tapered extremal portion of the "V". The second flap 9 of each deformable gripping element 5, 6 has an end 9a, opposite the distal end, which is directly engaged to a portion of the perimeter of the respective zone 3a, 3b of the constraint opening 3. Each deformable gripping element 5, 6 further comprises an attachment flap 11 developing without solution of continuity and connected to the first flap 8 on the opposite side with respect to the distal end 10. The attachment flap 11 develops transversely with respect to the first flap 8. The attachment flap 11 of each deformable gripping element 5, 6 engages the first flap 8 to a perimeter portion of the respective zone 3a, 3b of the constraint opening 3. The perimeter portion to which the attachment flap 11 is engaged is adjacent to the perimeter portion to which the end 9a of the second flap 9 is engaged. The attachment flap 11 and the end 9a of the second flap form an attachment portion of each deformable gripping element 5, 6, which engages each deformable gripping element 5, 6 to the constraint opening 3 in correspondence of the respective zone 3a, 3b.

Each deformable gripping element 5, 6 comprises a gripping neck 12 (which by way of example, in the annexed figures, is obtained integrally with the second flap 9) defining a shaped recess configured to embrace at least partially, in the gripping configuration, a respective portion of the container C. In the gripping configuration, the gripping neck 12 of the first deformable gripping element 5 and the gripping neck 12 of the second deformable gripping element 6 define, in interposition with each other, the inner gripping space. Each gripping neck 12 has a surface with curved or planar segments; in the embodiments referred to in the annexed figures (reported purely for explanatory but not limiting purposes), each gripping neck 12 has a surface with planar segments wherein each segment 12a, 12b 12c is substantially planar and lies in a plane not coplanar to a lying plane of an adjacent segment. In particular, the gripping neck 12 can comprise a first segment 12a, a second segment 12b and a third segment 12c, the second segment 12b being interposed between the first segment 12a and the third segment 12c. At least a segment 12a, 12b, 12c of each gripping neck 12 is configured to contact and embrace, in the gripping configuration, a respective portion N1, N2 of the container C. Optionally, at least two or all of the segments 12a, 12b, 12c of each gripping neck 12 are configured to contact and embrace, in the gripping configuration, a respective portion N1, N2 of the container C. Each gripping neck 12 can have a surface defined on at least one inclined plane with respect to a lying plane of the body 2. The plane of this surface can be inclined with respect to the lying plane of the body 2 by an angle comprised between 45° and 90°. The plane of this surface can therefore be orthogonal to the lying plane of the body 2 (thus making the gripping neck 12 optimal for retaining containers having a substantially cylindrical-shaped neck) or transversal to the lying plane of the body 2 (thus making the gripping neck 12 optimal for holding containers with a substantially trunk-conical shaped neck).

In order to ensure optimal contact and grip between each gripping neck 12 and the container C, each gripping neck 12 can have a thickness T at least equal to 4 mm or 5 mm; the thickness T can be comprised between 3 mm and 30 mm. The thickness T can be calculated along a direction orthogonal to the lying plane of the body 2; in this regard, see FIGS. 2 and 3.

Each deformable gripping element 5, 6 comprises at least one reinforcing rib 13 developing transversely and in interposition with respect to the first flap 8 and to the second flap 9. As illustrated in the annexed figures, each deformable gripping element 5, 6 can have a plurality of reinforcing ribs 13, which can be arranged substantially parallel to each other and be substantially equally spaced from each other. The annexed figures show deformable gripping elements 5, 6 comprising four reinforcing ribs 13; however, the reinforcing ribs 13 can be in any number, for example between 1 and 10.

In order to engage each deformable gripping element 5, 6 to the perimeter of the constraint opening 3, the gripping member 4 comprises a first connector 14 and a second connector 15 developing respectively between the first deformable gripping element 5 and a perimeter portion of the constraint opening 3 defined in correspondence of the first zone 3a and between the second deformable gripping element 6 and a perimeter portion of the constraint opening 3 defined in correspondence of the second zone 3b. The first connector 14 operates on the first deformable gripping element 5 and is engaged thereto. In particular, the first connector 14 is engaged with the first flap 8 of the first deformable gripping element 5 in correspondence of or near the distal end 10.

The first connector 14 is configured to provide deformation responsiveness to the first deformable gripping element 5 at least during the transition of the gripping member 4 from the rest configuration to the gripping configuration.

Similarly, the second connector operates on the second deformable gripping element 6 and is engaged thereto. In particular, the second connector 15 is engaged to the first flap 8 of the second deformable gripping element 6 in correspondence of or near the distal end 10. The second connector 15 is configured to provide deformation responsiveness to the second deformable gripping element 6 at least during the transition of the gripping member 4 from the rest configuration to the gripping configuration.

Each connector 14, 15 is deformable and can deform as a result of the deformation undergone by the respective deformable gripping element 5, 6 to which it is engaged. In particular, each connector 14, 15 is elastically deformable. In terms of deformation, each connector 14, 15 is configured to bend during the transition of the gripping member 4 from the rest configuration to the gripping configuration; in this regard, see FIG. 5 illustrating how the connectors 14, 15 can bend when the gripping member 4 assumes the gripping configuration. To allow this deformation and in particular this bending, a gap 23 is defined between each connector 14, 15 and a portion of perimeter adjacent to the constraint opening 3, which advantageously increases, starting from the perimeter of the constraint opening 3, up to the distal end 10.

Each connector 14, 15 is further configured to allow deformation responsiveness to the respective deformable gripping element 5, 6 to which it is engaged at least during the transition of the gripping member 4 from the rest configuration to the gripping configuration; basically, the first connector 14 provides deformation responsiveness to the first deformable gripping element 5 and the second connector 15 provides deformation responsiveness to the second deformable gripping element 6. Providing deformation responsiveness, each connector 14, 15 allows managing a controlled deformation of the respective deformable gripping element 5, 6 to which it is engaged. Each connector 14, 15 controls the deformation of the respective deformable gripping element 5, 6 to which it is engaged by bending by means of a force exerted on it by the distal end 10 of the deformable gripping element 5, 6 to which it is engaged (see FIG. 5), this force being a consequence of the transition of the gripping member from the rest configuration to the gripping configuration, in which it holds, embracing it, a container C. Basically, passing from the rest configuration to the gripping configuration, the presence of the container C in the inner gripping space 7 determines the elastic deformation of the deformable gripping elements 5, 6, whose deformation is controlled and constrained by the flection of the respective connector 14, 15. Each connector 14, 15 can be in the shape of a rod or a plate.

The gripping device 1 can further comprise constraint elements 17 cooperating with each other and configured to constrain firmly in position, in the gripping configuration, the first deformable gripping element 5 and the second deformable gripping element 6. The constraint elements 17 comprise at least one constraint head 17a and at least one constraint housing 17b configured to house the constraint head 17a. The constraint head 17a is configured to insert itself in the respective constraint housing 17b and engage within it to define the gripping configuration of the gripping member 4. As illustrated in the annexed figures, the constraint head 17a has a substantially wedge-shaped or arrow-shaped configuration and the constraint housing 17b comprises deformable constraint flaps 17b', 17b". The constraint head 17a is configured to spread out, due to the wedge-shaped conformation of the thrust surfaces 17a', 17a", such constraint flaps 17b', 17b" when engaging with the constraint housing 17b, determining a snap-type coupling once the thrust surfaces 17a', 17a" have completely penetrated inside the constraint flaps 17b', 17b". At least one constraint head 17a can be defined in correspondence of one of the first gripping jaw 2a and the second gripping jaw 2b and at least one respective constraint housing 17b can be defined in correspondence of the other between the first gripping jaw 2a and the second gripping jaw 2b. The embodiments of FIGS. 1, 2 and 3 show gripping jaws 2a, 2b each of which has a constraint head 17a configured to be engaged to a constraint housing 17b of the other gripping jaw 2b, 2a and a constraint housing 17b configured for housing a constraint head 17a of the other gripping jaw 2b, 2a.

In addition to the constraint elements 17, the gripping device 1 can also comprise a hinge 18 connecting the first gripping jaw 2a and the second gripping jaw 2b so as to give the gripping device a monolithic configuration; FIGS. 1 and 2 show an embodiment wherein the gripping device 1 is equipped with constraint elements 17 defined both in proximity of the hinge 18 connecting the first gripping jaw 2a and the second gripping jaw 2b, and in proximity of the portion opposite the hinge 18. The hinge 18 can be obtained in the form of a connecting band between the first gripping jaw 2a and second gripping jaw 2b, presenting a curvature capable of giving elasticity to the hinge 18 such as to determine a certain span between the first gripping jaw 2a and the second gripping jaw 2b in the rest configuration of the gripping device 1. Obviously, the constraint elements 17 are configured in such a way as to determine, in the gripping condition of the gripping device 1, a clamping force such as to overcome the elastic force of the hinge 18.

The gripping device 1 can further comprise positioning stops 19 configured to allow, in the gripping configuration, precise interfacing between the first gripping jaw 2a and the second gripping jaw 2b (see for example FIG. 4 and FIG. 5). The positioning stops 19 include a seat 19a and a protrusion 19b configured to be housed in the seat 19a, in particular counter-shaped to the seat 19a. The positioning stops 19 can be defined in proximity of the constraint elements 17, so as to also act as guiding means to facilitate the insertion of the constraint head 17a in the constraint housing 17b. Positioning stops 19 can be arranged in the same portion of the body 2 comprising the hinge 18 connecting the first gripping jaw and the second gripping jaw. In addition or alternatively, the positioning stops 19 can be arranged in correspondence of the portion of the body 2 opposite to the one comprising the hinge 18. FIGS. 1 and 2 show an embodiment wherein the gripping device 1 is equipped with positioning stops 19 defined both in proximity of the hinge 18 connecting the first gripping jaw 2a and the second gripping jaw 2b, and in proximity of the portion opposite the hinge 18.

The gripping device 1 can have a plurality of through openings 20 with respect to the body 2, the through openings 20 substantially acting as lightening portions of the body, in order to optimize the amount of material necessary for making the gripping device 1, with evident economic benefits, too. As the gripping device 1 in accordance with the present invention finds application in the biomedical sector, these through openings 20 are configured to channel and allow the passage of a flow of fluid, such as air, during sterilization of the gripping device 1 or at least a part or a component thereof (for example during the sterilization of the body 2). In particular, the through openings 20 are configured so that the laminar conditions of the flow of fluid, such as air, which strikes the gripping device 1 during its sterilization, is not significantly altered.

In accordance with an advantageous embodiment of the present invention, on the gripping device 1 (in particular on the body 2) one or more remarkable points are obtained, which can be used to carry out predetermined actions (for example aimed at introducing degrees of constraint to the gripping device 1) or simply as reference points.

The remarkable points can be conveniently obtained in the form of though-holes and/or in the form of protrusions.

Figure 7:
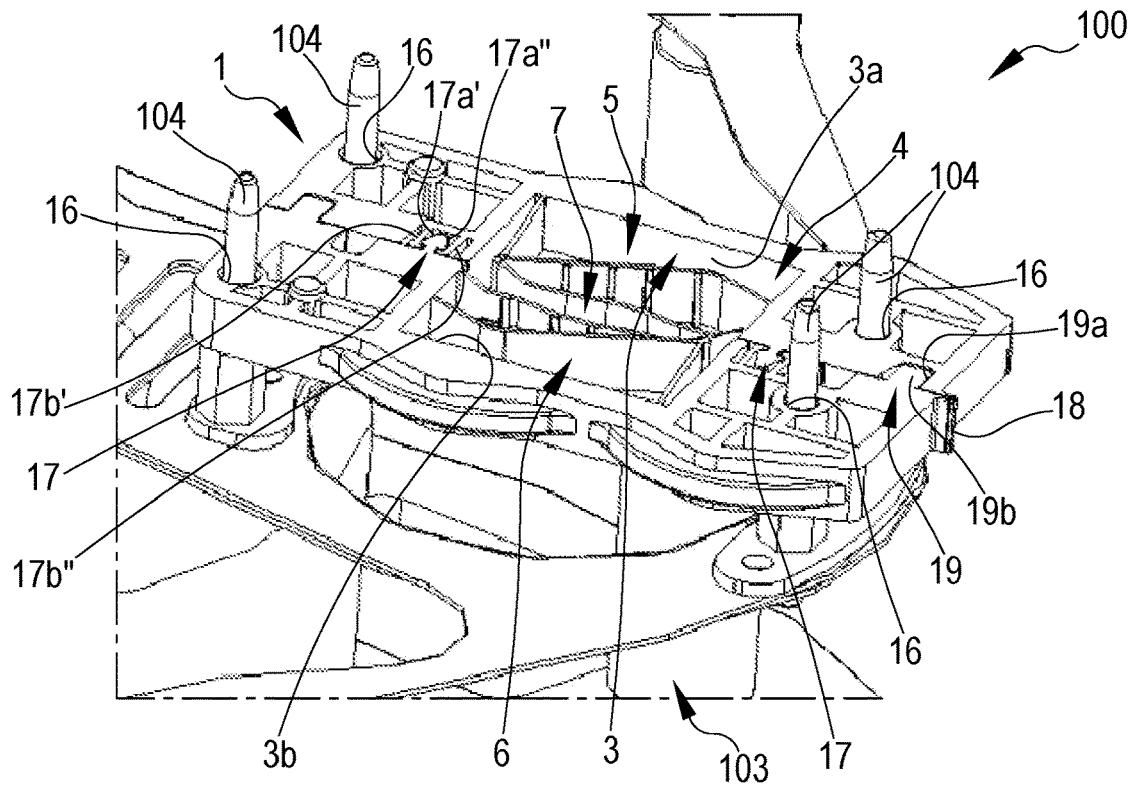
FIG. 7 is a detailed view of an apparatus in accordance with one embodiment of the present invention, in particular illustrating a stirrer engaged to the gripping device by means of suitable fastening elements inserted in correspondence of respective through-holes of the gripping device (for simplicity, illustrated in the rest condition).

The body 2 of the gripping device 1 can have at least one through-hole 16 configured to allow the insertion of a pin 104 integral with an apparatus 100, the engagement determined by the insertion of the pin 104 in the through-hole 16, binding in a stable manner the gripping device 1 (and consequently the container C retained by the gripping device 1) to the apparatus 100. In FIG. 7 it is shown, for explanatory but not limiting purposes, an example of such engagement involving the pin 104 and the through-hole 16, the apparatus 100 to which the pin 104 is integral being in particular a stirrer. The body 2 can have a plurality of through-holes 16, for example a number between one and ten; the annexed figures show embodiments of the gripping device 1 wherein the through-holes 16 are four in number. The body 2 can have through-holes 16 arranged in correspondence of opposite longitudinal ends of the body 2. In particular, the body 2 can have a pair of through-holes 16 arranged in correspondence of the same longitudinal end of the body 2. The annexed figures show embodiments of the gripping device 1 wherein the body 2 has a respective pair of through-holes 16 arranged in correspondence of each longitudinal end of the body 2, each through-hole 16 being therefore associated with a corner of the body 2.

As an alternative to the at least one through-hole 16 or in combination with the at least one through-hole 16, the body 2 of the gripping device 1 can provide at least one protrusion 25. The annexed figures show exemplificatory embodiments of the gripping device 1 wherein the body 2 has, in addition to four through-holes 16, two protrusions 25 which protrude from the surface of the body 2 extending along a substantially orthogonal direction to the surface of the body 2. These protrusions 25 are arranged in proximity of a pair of through-holes 16. A pair of protrusions 25 can extend also from the opposite surface of the body 2 (not visible in the annexed figures). Although the protrusions 25 are represented in the annexed figures as having a cylindrical conformation, from this representation no limitation shall be established in this regard. In fact, for the protrusions 25 non-axisymmetric conformations can be adopted (for example triangle, square or star conformations), which have the additional advantage to be able to act as constraints against the rotation of the gripping device 1 when the protrusions 25 are housed in dedicated seats of an apparatus 100.

Figure 6:
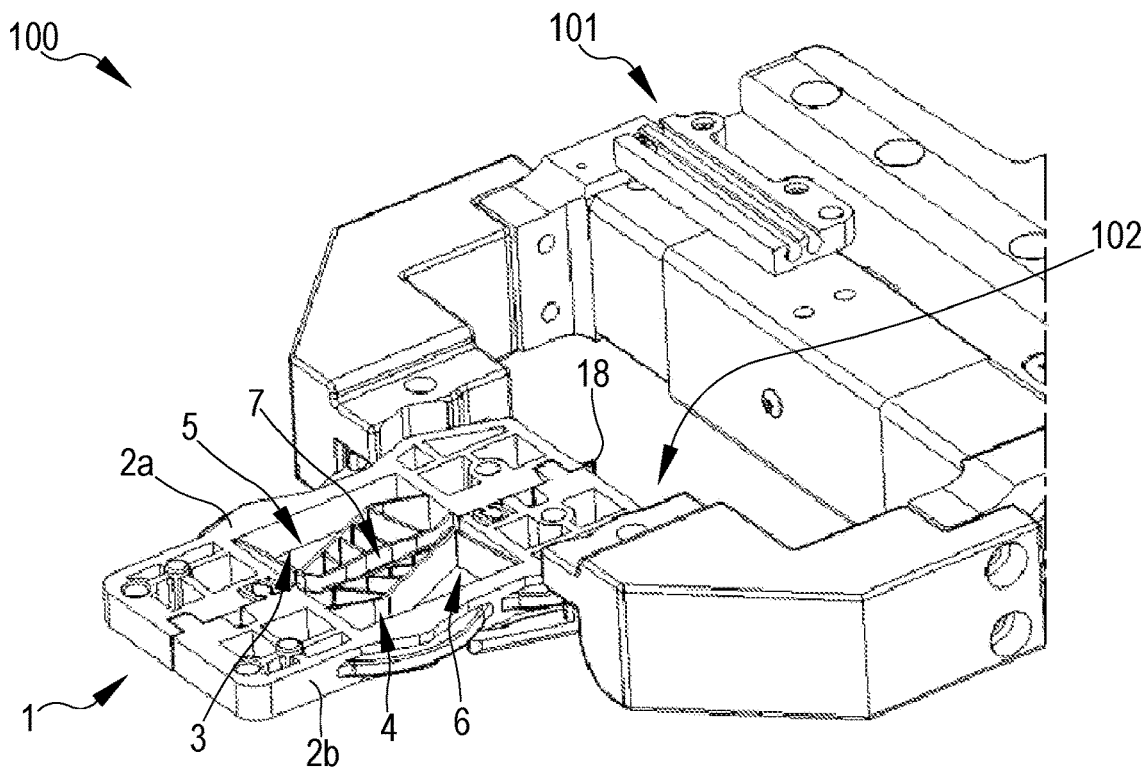
FIG. 6 is a detailed view of a device in accordance with one embodiment of the present invention, in particular illustrating a handling device gripping and manipulating the gripping device (for simplicity, illustrated in the rest condition)

To facilitate the manipulation by a handling device 101, such as a mechanical or robotic arm, the body 2 of the gripping device 1 can comprise at least one anchoring element 21. The anchoring element 21 allows the gripping of the gripping device 1 by a manipulator, in particular a manipulator of a handling device 101, such as a mechanical or robotic arm, for the purpose of allowing the manipulation, in particular the automatic manipulation, of the gripping device 1. As illustrated in the annexed figures, the body 2 comprises anchor elements 21 arranged in correspondence of opposite side ends of the body 2. By way of example, the body can comprise a pair of anchoring elements 21 arranged in correspondence of the same lateral end of the body 2; the anchoring elements 21 of this pair are placed side by side (see FIG. 1). As illustrated in the accompanying figures, each anchoring element 21 can be in the form of a camber, in particular an arc of circumference or arc of an ellipse, the manipulator presenting, in its own gripping interface, a profile complementary to the profile of the anchoring element 21 (as can be seen in FIG. 6).

Advantageously, the anchoring elements 21 can also be used to introduce degrees of constraint to the gripping device 1 with reference to an apparatus 100, such as for example a stirrer. It can in fact be provided that the apparatus 100 comprises, for housing the gripping device 1, a cradle which is counter-shaped to the external profile of the gripping device, in particular to the anchoring elements 21.

The annexed figures show embodiments of the gripping device 1 wherein the first gripping jaw 2a and the second gripping jaw 2b are configured to be relatively moved at least between a rest configuration at least partially open and a clamped gripping configuration. The relative movement between the first gripping jaw 2a and the second gripping jaw 2b in the transition from the open rest configuration to the clamped gripping configuration determines the relative approach between the first deformable gripping element 5 and the second deformable gripping element 6 and the relative movement between the first gripping jaw 2a and the second gripping jaw 2b in the transition from the clamped gripping configuration to the open rest configuration determines the relative distancing between the first deformable gripping element 5 and the second deformable gripping element 6.

The relative movement between the first gripping jaw 2a and the second gripping jaw 2b can basically be a rotation; for this purpose, as illustrated for instance in FIGS. 1 and 2, the first gripping jaw 2a and the second gripping jaw 2b can be hinged to each other. In this embodiment, the gripping jaws 2a, 2b are hinged to each other and form a single piece (monolithic configuration). This obviously does not exclude that, alternatively, the gripping jaws 2a, 2b can be formed by two separate pieces. Advantageously, said two separate pieces have such a geometry that they can be made by using the same mold. The transition between the rest configuration and the gripping configuration is obtained by rotating the gripping jaws 2a, 2b and bringing the ends of the gripping jaws 2a, 2b closer to each other, in a terminal step of the rotation the constraint elements 17 being engaged to each other in such a way to guarantee the keeping of the gripping configuration and, where provided, the positioning stops 19. The gripping configuration wherein the constraint elements and the positioning stops are respectively engaged with each other is illustrated in FIGS. 5, 6, and 7.

In another embodiment, the relative movement between the first gripping jaw 2a and the second gripping jaw 2b can be substantially a translation; in such embodiment, illustrated by way of example in FIG. 3, the first gripping jaw 2a and the second gripping jaw 2b are formed by two separate pieces that can be brought closer to each other forming the gripping configuration of the gripping member 4. FIG. 3 illustrates a rest configuration wherein the first gripping jaw 2a and the second gripping jaw 2b are spaced apart from each other, the transition between the rest configuration and the gripping configuration being obtained by bringing the gripping jaws 2a, 2b closer to each other and engaging the constraint elements 17 to each other in such a way to guarantee the keeping of the gripping configuration and engaging to each other, where provided, the positioning stops 19.

In another embodiment not shown in the annexed figures, the body 2 of the gripping device 1 can be in one piece (monolithic configuration) and the first gripping jaw 2a and the second gripping jaw 2b are monolithic; substantially, in this embodiment, the gripping jaws 2a, 2b cannot be mutually moved. In such embodiment, the transition of the gripping member 4 from the rest configuration to the gripping configuration is carried out simply by inserting a portion of the container C, such as a neck N of the container C, in correspondence of the inner gripping space 7 defined between deformable gripping elements 5, 6 and forcing a separation of these elements. In fact, the insertion of the container C in correspondence of the inner gripping space 7 determines the deformation of the deformable gripping elements 5, 6 and of the respective connectors 14, 15. In this embodiment, the inner gripping space 7 between the deformable gripping elements 5, 6 can be defined both in the rest configuration and in the gripping configuration, the inner gripping space 7 in the rest configuration, however, having a passage area smaller than a passage area of the inner space in the gripping configuration. In the gripping configuration, the passage area of the inner gripping space 7 is in fact greater than the passage area of the inner gripping space 7 defined in the rest configuration due to the positioning of a portion of the container C in the inner gripping space 7, which determines a widening thereof.

In a possible variant, the deformable gripping elements 5, 6 can be in pretension, for example by means of pretension means, which keep said deformable gripping elements 5, 6 in a widened configuration. The pretension means can be of the elastic type and can include one or more springs, for example at least one dedicated spring operating on each deformable gripping element 5, 6. It is thanks to this widened configuration that is easy to insert the container C between the deformable gripping elements 5, 6; subsequently removing the pretension exerted, the deformable elements 5, 6 return to their original configuration (gripping configuration) embracing and holding the container C, for example by adapting to its neck N. This variant can be advantageously used in the embodiment which provides the body 2 of the gripping device 1 in a single piece. In the preferred embodiment of the gripping device 1, this is of the disposable type. Basically, the gripping device 1 can be of the disposable type and can be thrown away after use, for example together with the container C; in this way, it is advantageously avoided to lengthen the working time due to the possible addition of a cleaning step of the device 1, and immunity from possible contamination is maximized.

In the embodiment wherein the gripping device 1 is of the disposable type, the body 2 can be made of plastic or polymeric material, such as polypropylene.

Providing such material advantageously allows minimizing the production costs of the gripping device 1.

In another embodiment of the gripping device 1, the body 2 can be reusable, while the gripping member 4 can be thrown away after use (i.e., after being used for holding a single container C), for example together with the container C. The body 2 therefore acts as a frame, to which an insert containing the gripping member 4 is applied, so as to obtain, following this application, the gripping device 1. In this embodiment wherein the body 2 is reusable, it can be in metallic material, while the insert can be in plastic or polymeric material, such as polypropylene. Such embodiment is optimal as regards the amount of material used and therefore has undoubted benefits, both economic and environmental.

It is intended to specify that the present invention does not involve any limitations about the geometry and about the sizing of the components of the gripping device 1 described and represented herein (in particular about the geometry of the body 2), since such geometry and dimensions can be conveniently varied in accordance with the needs of use of the gripping device 1. In particular, such geometry and dimensions can be adapted to the geometry and the dimensions of the containers C intended to be retained by means of the gripping device 1 and/or of the parts of the apparatus 100 destined to cooperate with the gripping device 1. In any case, given the presence of the gripping member 4 and in particular of the first deformable gripping element 5 and of the second deformable gripping element 6, the geometry and the dimensions adopted for the gripping device 1 can ensure optimal interfacing both with the containers C and with the apparatus 100. Therefore, all the geometric characteristics and all the dimensional characteristics shown in the present description are to be interpreted as purely exemplifying characteristics of the gripping device 1.

Use

The present invention also relates to the use of the gripping device 1 of the previously described type for gripping a container C, such as a bottle.

The use provides for retaining the container C, for example a bottle, in particular the neck N of the container C, while the gripping member 4 is in the gripping configuration, i.e., while the deformable gripping elements 5, 6 and the connectors 14, 15 are in a deformed configuration, in accordance with what previously described.

Equipment

The object of the present invention is also an apparatus 100 for processing at least one container C comprising a gripping device 1 of the type described above. A peculiar feature of said apparatus 100 is to include specific structural elements for creating a constraint with the gripping device 1 in the gripping condition of the latter, and consequently indirectly with the container C.

The apparatus 100 can comprise functional devices of various types and typically has a preferred use in the biomedical sector: possible examples of such functional devices are represented by devices for agitating the container C and/or by devices for inserting solvent into the container C and/or by devices for aspirating the content (drug) of the container C and/or by devices for weighting the content of the container C.

The apparatus 100 may comprise a housing in correspondence of which the gripping device 1 can be positioned or is positioned. The housing is configured to house the gripping device 1; for this purpose, the housing can be at least partially counter-shaped to an external profile of the gripping device 1.

The apparatus 100 preferably comprises a plurality of housings, each of which is configured to house a respective gripping device 1. Each housing can be in the form of a hollow support, having a cavity which can be at least partially counter-shaped to an external profile of the gripping device 1 (for example by providing a counter-shaped portion to the anchoring elements 21).

The apparatus 100 can comprise a carousel, the plurality of housings for the respective gripping devices 1 being formed on at least one revolving support of said carousel. The carousel superintends the processing of the containers C, being configured in such a way as to provide a plurality of stations, in each of which one or more operations are carried out (preferably automatically) on the containers C and/or the contents thereof. As an example (but certainly not limiting) of a configurable carousel to process containers C by means of the gripping device 1 in accordance with the present invention, patent U.S. Pat. No. 10,259,608B2 in the name of the same Applicant can be mentioned.

The apparatus 100 may comprise (additionally or alternatively to the at least one housing for the gripping device) a manipulator, i.e., a handling device 101 (see FIG. 6, wherein for simplicity of illustration the container C has been omitted), such as an anthropomorphic robot or a Cartesian robot. This robot comprises a mechanical arm, configured to manipulate the gripping device 1, being equipped for example with a dedicated gripper. The handling device 101 can comprise a gripper 102 configured to grasp the gripping device 1, for example in correspondence of one or more anchoring elements 21; the gripper 102 advantageously allows a secure grip of the gripping device 1 and therefore optimal handling of the gripping device 1.

The apparatus 100 can further comprise a suction station; the handling device 101 can handle the gripping device 1 and the relative container C retained by it in correspondence of the suction station.

The apparatus 100 can further comprise a weighing station, which can include a scale. The weighing station can be configured for weighing a container C and its content.

The apparatus 100 can further comprise an injection station. The injection station can be configured to inject a substance into the container C.

The apparatus 100 can further comprise a stirrer 103 (see FIG. 7, wherein for simplicity of illustration the container C has been omitted) configured to agitate the gripping device 1 and, when the gripping device 1 is in use with the gripping member 4 in the gripping configuration, the container C retained by the gripping member 4.

In the stirrer 103, and more generally in the apparatus 100 whatever its type, at least one rod-shaped element is included, i.e., a pin 104, in particular a plurality of pins 104. Each pin 104 is configured for being inserted in correspondence of a respective through-hole 16 of the body 2. In this regard, FIG. 7 illustrates, by way of example, a stirrer 103 equipped with four pins 104, each of which is thoroughly housed in correspondence of a respective through-hole 16 of the body 2. The number of pins 104 may be different than four; for example, it can be between one and ten.

Process for Producing a Gripping Device

The present invention also relates to a process for producing a gripping device 1 of the previously described type.

The process provides for the provision of a body 2 and a gripping member 4 of the previously described type and to engage the gripping member 4 to the body 2, arranging the first deformable gripping element 5 in correspondence of the first zone 3a and the second deformable gripping element 6 in correspondence of the second zone 3b.

These steps can be carried out by injection molding of plastic or polymeric material, such as polypropylene. Basically, the body 2 and the gripping member 4 can be made by means of a single molding operation by injection of plastic or polymeric material. The gripping member 4 can have greater flexibility than the body 2, which allows its deformability and its ability to adapt to the container C to be retained. Conversely, the body 2 can have greater rigidity than the gripping member 4. The different flexibility of the gripping member 4 can be obtained by making the elements of the latter particularly thin.

The embodiment of FIG. 3, in accordance to which the gripping device 1 comprises two separate pieces, requires the two pieces to be individually obtained by injection molding of plastic or polymeric material, such as polypropylene.

In the embodiment of the gripping device 1 which provides the reusability of the body 2, the process for producing the gripping device 1 instead consists of a production step of the body 2 (for example by shaping a metal sheet) and a production step of the gripping member 4 (for example by means of an injection molding operation of plastic or polymeric material), these steps being carried out in such a way as to obtain reciprocal constraint means which then allow the subsequent removable connection between the body 2 and gripping member 4.

It is intended to clarify that the steps providing the body 2 and of the gripping member 4 of the process for producing the gripping device 1 in accordance with the present invention can employ, instead of injection molding, any suitable technology, such as three-dimensional printing.

Gripping Process of a Container

The present invention also relates to a gripping process of a container C, such as a bottle. This process makes use of a device 1 of the type described above.

The process provides for retaining at least a portion of a container C by means of the first deformable gripping element 5 and the second deformable gripping element 6. The retained portion of the container C can be defined, for example, in correspondence of a neck N of the container C.

The gripping device 1 can be arranged in the rest configuration and the process can provide, in order to retain a container C, for determining a transition of the gripping member 4 from the rest configuration to the gripping configuration, so as to retain a portion of the container by means of the first deformable gripping element 5 and the second deformable gripping element 6. The transition of the gripping member 4 from the rest configuration to the gripping configuration can be carried out by relatively moving the gripping jaws 2a, 2b in accordance with what previously described, for example by rotating the gripping jaws 2a, 2b (embodiments of FIGS. 1-2, 4-7, wherein the gripping jaws 2a, 2b are hinged to each other) or by moving, by translation, the gripping jaws 2a, 2b (embodiment of FIG. 3, wherein the gripping jaws 2a, 2b are formed by two separate pieces). In the embodiments of the annexed figures, the transition of the gripping member 4 from the rest configuration to the gripping configuration is carried out by means of a relative approach between deformable gripping elements 5, 6. In such embodiments (which provide for relatively moving the gripping jaws 2a, 2b), in a step prior to the handling, it is provided an appropriate positioning of a container C in a space defined between the first gripping jaw 2a and the second gripping jaw 2b. The step of positioning the container C in the space defined between the first gripping jaw 2a and the second gripping jaw 2b can be carried out manually, for example by an operator, or automatically, for example by means of a device dedicated to positioning containers C.

In the embodiment not shown in the annexed figures, wherein the gripping jaws 2a, 2b are in one piece and cannot be mutually moved, the transition of the gripping member 4 from the rest configuration to the gripping configuration can be done simply by inserting a portion of the container C, such as a neck N of the container C, in correspondence with the inner gripping space 7, forcing a divarication between the first deformable gripping element 5 and the second deformable gripping element 6. The step of inserting the container C in correspondence of the inner gripping space 7 can be carried out manually, for example by an operator, or automatically, for example by means of a device dedicated to the insertion of containers C.

The gripping member 4 retains a portion of the container C by means of elastic deformation of the first deformable gripping element 5, of the second deformable gripping element 6, of the first connector 14 and of the second connector 15 in accordance with what has been previously described; the gripping configuration, wherein the first deformable gripping element 5, the second deformable gripping element 6, the first connector 14 and the second connector 15 are deformed, is illustrated by way of example in FIG. 5. Furthermore, the step of retaining a portion of the container C is carried out by putting in contact the gripping neck 12 of the first deformable gripping element 5 with a first portion N1 of the container C and bringing into contact the gripping neck 12 of the second deformable gripping element 6 with a second portion N2 of the container C, which can be contiguous or adjacent and, in addition or alternatively, opposed to each other.

The first portion N1 and the second portion N2 of the container C are preferably defined in correspondence of the neck N of the container C. Bringing into contact the gripping neck 12 of the first deformable gripping element 5 with the first portion N1 of the container C and the gripping neck 12 of the second deformable gripping element 6 with the second portion N2 of the container C allows to deform both the deformable gripping elements 5, 6 and the respective connectors 14, 15 connected to them.

As illustrated by way of example in FIG. 5, in the gripping configuration, the container C is therefore retained in a stable, firm and secure manner by the gripping member 4.

ADVANTAGES OF THE INVENTION

From what has been described and represented above, it is clear how the present invention can fully overcome all the preceding complained critical issues, with particular reference to the gripping device referred to in U.S. Pat. No. 9,746,012B2.

The present invention allows to obtain a gripping device 1 which is adaptable, thanks to the structure and the deformability of the previously described gripping member 4, to a plurality of containers C. Consequently, it is not necessary to design an ad hoc gripping device 1 for each container or bottle C to be grasped by means of the gripping device 1, but, thanks to the invention, it is possible to obtain a gripping device 1 capable of gripping a plurality of containers C different from each other, for example in terms of size and/or volume and/or conformation. In particular, the gripping device 1 in accordance with the present invention is capable of stably retain containers C of different diameters, and it is also capable of grasping cylindrical portions of the containers C, as well as truncated-cone portions.

In this way, the invention allows the standardization of the grip by the handling device 101 of the apparatus 100, which can therefore always work with the same gripping settings.

The invention, therefore, achieves the considerable advantage of making each container C machinable, regardless of the size and/or conformation of the neck N.

The invention then allows obtaining a considerable speed up of the operations to which the container C is subjected, since it makes it possible to carry out these operations automatically.

Allowing an optimal grip thanks to a close contact between gripping elements 5, 6 and the container C, the gripping device 1 in accordance with the invention minimizes or even nullifies the probability of damage or breakage of container C due to gripping errors. This turns out to be particularly significant when the container C is subject to agitation, since the presence of the gripping device 1 avoids any possible contact between the container C and the stirrer 103.

In the embodiment wherein the gripping device 1 is of the disposable type, after being used it can be thrown away, for example together with the container C, advantageously avoiding lengthening the working time due to the possible addition of the cleaning step of the gripping device 1, and immunity from possible contamination is maximized.

The gripping device 1 in accordance with the invention also has high operational flexibility, in particular being compatible with a possible device dedicated to automatically place or insert containers C inside the gripper 1.

As far as the process of gripping a container C in accordance with the invention, it advantageously allows retaining a plurality of different containers C.

Furthermore, the process for gripping a container C in accordance with the invention allows retaining containers C in a stable, firm and secure way by means of the first deformable gripping element 5 and the second deformable gripping element 6 of the gripping member 4.

The invention also provides for a process for producing a gripping device 1 which allows obtaining a gripping device 1 at low cost and, at the same time, stable and reliable.

The advantages just described with reference to the gripping device 1 and the process for gripping a container C are also shared by the use of a gripping device 1, from the apparatus 100 and from the process for producing a gripping device 1 previously described. Numerous variants of the gripping device 1 as described and represented are certainly possible, those variants falling in any case within the scope of protection defined by the following claims.

What is claimed is:

1. A gripping device comprising:
    a body defining a constraint opening divided into a first zone and a second zone,
    a gripping member configured to grasp a container, the gripping member being engaged to the body and comprising at least:
        a first deformable gripping element arranged in correspondence of the first zone, the first deformable gripping element being configured to embrace, when the gripping device is in use, a first portion of the container,
        a second deformable gripping element arranged in correspondence of the second zone, the second deformable gripping element being configured to embrace, when the gripping device is in use, a second portion of the container distinct from the first portion of the container,
    the first deformable gripping element and the second deformable gripping element being configured to form an inner gripping space, the gripping member being configured to operate at least between:
    a rest configuration,
    a gripping configuration wherein the first deformable gripping element and the second deformable gripping element are deformed and retain, when the gripping device is in use and in correspondence of the inner gripping space, the container, in the gripping configuration the first deformable gripping element being in contact with the first portion of the container and the second deformable gripping element being in contact with the second portion of the container,
    wherein at least one of the first deformable gripping element and the second deformable gripping element has a conformation equipped with a first flap and a second flap joined together at a distal end, at least one reinforcing rib developing transversely and in interposition with respect to the first flap and the second flap.

2. The gripping device according to claim 1, wherein each of the first deformable gripping element and the second deformable gripping element comprises a gripping neck defining a shaped recess configured to embrace, in the gripping configuration, a respective portion of the container, in the gripping configuration the gripping neck of the first deformable gripping element and the gripping neck of the second deformable gripping element defining, by interposition, the inner gripping space.

3. The gripping device according to claim 2, wherein the gripping neck of the first deformable gripping element and the gripping neck of the second deformable gripping element present a respective surface lying in a plane defining with the lying plane of the body an angle between 60° and 90°.

4. The gripping device according to claim 2, wherein the gripping neck of the first deformable gripping element and the gripping neck of the second deformable gripping element have a respective thickness between 3 mm and 30 mm the thickness being measured along a direction orthogonal to the lying plane of the body.

5. The gripping device according to claim 1, wherein the gripping member comprises:
    a first connector operating on the first deformable gripping element, the first connector being deformable and being configured to provide a deformation responsiveness to the first deformable gripping element at least upon the transition of the gripping member from the rest configuration to the gripping configuration, and/or
    a second connector operating on the second deformable gripping element, the second connector being deformable and being configured to provide a deformation responsiveness to the second deformable gripping element at least during the transition of the gripping member from the rest configuration to the gripping configuration,
    the first connector and the second connector being configured to deform upon the transition of the gripping member from the rest configuration to the gripping configuration.

6. The gripping device according to claim 5, wherein the first deformable gripping element and the second deformable gripping element each comprise a distal end, the first connector connecting the distal end of the first deformable gripping element to a perimeter portion of the constraint opening in correspondence of the first zone and the second connector connecting the distal end of the second deformable gripping element to a perimeter portion of the constraint opening in correspondence of the second zone.

7. The gripping device according to claim 1, wherein each of the first deformable gripping element and the second deformable gripping element has a conformation equipped with a respective first flap and a respective second flap joined together at a distal end, at least one reinforcing rib developing transversely and in interposition with respect to the first flap and the second flap.

8. The gripping device according to claim 1, wherein each of the first deformable gripping element and the second deformable gripping element comprises an attachment flap, the attachment flap being connected to at least one of the first flap and the second flap and connecting said at least one of the first flap and the second flap to a perimeter portion of the constraint opening in correspondence with the respective zone.

9. The gripping device according to claim 1, wherein the body comprises at least one rounded-shaped anchoring element, suited to allow the gripping device to be manipulated by a handling device, the handling device being an anthropomorphic robot or a cartesian robot.

10. The gripping device according to claim 9, wherein the body comprises anchoring elements arranged at opposite side ends of the body, according to a distribution providing a pair of anchoring elements placed side by side in correspondence of the same lateral end of the body.

11. A gripping device comprising:
a body defining a constraint opening divided into a first zone and a second zone,
a gripping member configured to grasp a container, the gripping member being engaged to the body and comprising at least:
  a first deformable gripping element arranged in correspondence of the first zone, the first deformable gripping element being configured to embrace, when the gripping device is in use, a first portion of the container,
  a second deformable gripping element arranged in correspondence of the second zone, the second deformable gripping element being configured to embrace, when the gripping device is in use, a second portion of the container distinct from the first portion of the container,
the first deformable gripping element and the second deformable gripping element being configured to form an inner gripping space, the gripping member being configured to operate at least between:
  a rest configuration,
  a gripping configuration wherein the first deformable gripping element and the second deformable gripping element are deformed and retain, when the gripping device is in use and in correspondence of the inner gripping space, the container, in the gripping configuration the first deformable gripping element being in contact with the first portion of the container and the second deformable gripping element being in contact with the second portion of the container,
wherein the gripping device further comprises constraint elements cooperating with each other and configured to constrain the first deformable gripping element and the second deformable gripping element in position, in the gripping configuration, and
wherein said constraint elements comprise at least one constraint head and at least one constraint housing configured to house said at least one constraint head, said at least one constraint head being configured for insertion into said at least one constraint housing and engaging within it to define the gripping configuration of the gripping member.

12. The gripping device according to claim 11, wherein said at least one constraint head is substantially wedge-shaped or arrow-shaped and said at least one constraint housing comprises deformable constraint flaps.

13. A gripping device comprising:
a body defining a constraint opening divided into a first zone and a second zone,
a gripping member configured to grasp a container, the gripping member being engaged to the body and comprising at least:
  a first deformable gripping element arranged in correspondence of the first zone, the first deformable gripping element being configured to embrace, when the gripping device is in use, a first portion of the container,
  a second deformable gripping element arranged in correspondence of the second zone, the second deformable gripping element being configured to embrace, when the gripping device is in use, a second portion of the container distinct from the first portion of the container,
the first deformable gripping element and the second deformable gripping element being configured to form an inner gripping space, the gripping member being configured to operate at least between:
  a rest configuration,
  a gripping configuration wherein the first deformable gripping element and the second deformable gripping element are deformed and retain, when the gripping device is in use and in correspondence of the inner gripping space, the container, in the gripping configuration the first deformable gripping element being in contact with the first portion of the container and the second deformable gripping element being in contact with the second portion of the container,
wherein the body defines a structure comprising a first gripping jaw and a second gripping jaw, the first zone being defined in correspondence with the first gripping jaw and the second zone being defined in correspondence with the second gripping jaw, the first deformable gripping element being carried by and being integral with the first gripping jaw and the second deformable gripping element being carried by and being integral with the second gripping jaw,
wherein the gripping device further comprises one or more positioning posts configured to allow a predetermined positioning between the first gripping jaw and the second gripping jaw, in the gripping configuration, and
wherein said one or more positioning posts comprise a seat and a protrusion, said seat and said protrusion being counter-shaped to each other, so as to allow said protrusion to be housed in said seat in said gripping configuration of said gripping device.

14. The gripping device according to claim 13, wherein the first gripping jaw and the second gripping jaw are hinged to each other.

15. The gripping device according to claim 13, wherein the first gripping jaw and the second gripping jaw are configured to be relatively moved at least between a rest configuration at least partially open and a clamped gripping configuration, the relative movement between the first gripping jaw and the second gripping jaw in the transition from the open rest configuration to the clamped gripping configuration determining the relative approach between the first deformable gripping element and the second deformable gripping element and the relative movement between the first gripping jaw and the second gripping jaw in the transition from the clamped gripping configuration to the open rest configuration determining the relative distancing between the first deformable gripping element and the second deformable gripping element.

* * * * *